Sept. 25, 1962   C. SACCOMANDI   3,056,020
VEHICLE HEADLIGHT

Filed Nov. 4, 1960   2 Sheets-Sheet 1

Inventor
Corrado Saccomandi
By Stevens Davis Miller & Mosher
Attorneys

Sept. 25, 1962  C. SACCOMANDI  3,056,020
VEHICLE HEADLIGHT
Filed Nov. 4, 1960  2 Sheets-Sheet 2
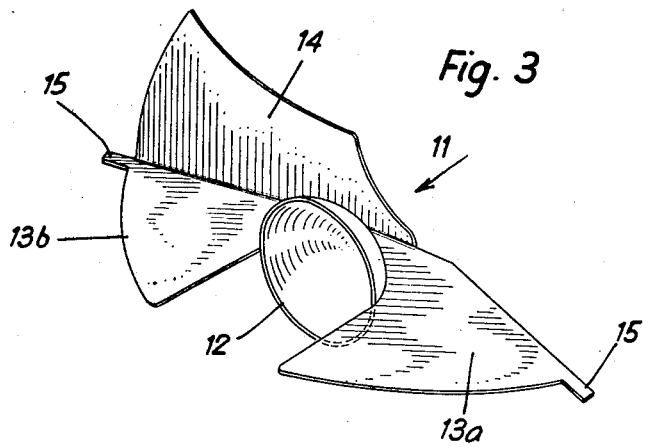
Fig. 3
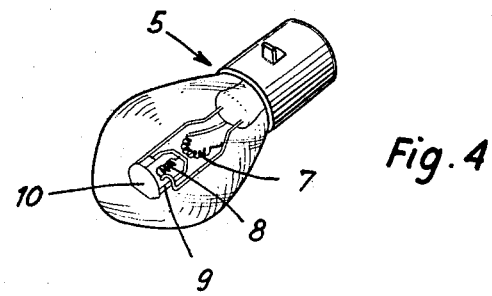
Fig. 4
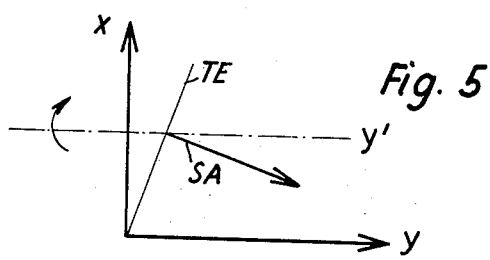
Fig. 5
Fig. 6
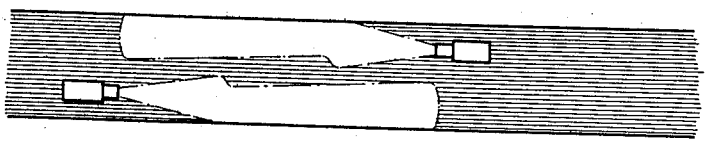
Inventor
Corrado Saccomandi
By Stevens Davis Miller & Mosher
Attorneys

United States Patent Office 3,056,020
Patented Sept. 25, 1962

3,056,020
VEHICLE HEADLIGHT
Corrado Saccomandi, Via Cupa Del Principe 4,
Naples, Italy
Filed Nov. 4, 1960, Ser. No. 67,388
Claims priority, application Switzerland Feb. 11, 1960
8 Claims. (Cl. 240—41.25)

The present invention relates to a novel and improved headlight construction for a vehicle.

It has been frequently attempted to provide headlights, particularly for automotive vehicles, which blind oncoming vehicles as little as possible. Various dimming systems have been provided but they are not able to completely satisfy this purpose.

It is an object of the present invention to provide a headlight which will solve the problem of practically dazzle-free illumination both in connection with high or bright lights and dimmed lights.

The headlight of the present invention comprises the conventional reflector, lens and bifilament bulb and is characterized by the fact that the reflector is so arranged that the axis of the beam is directed obliquely downwardly and toward one side with respect to the direction of travel of the vehicle, there being provided between the reflector and lens a diaphragm or shield comprising a cup which overlies or covers the outer end of the bulb, two sections or lobes which extend to opposite sides from the cup and are arranged perpendicular to the reflector surface and a section or lobe which is perpendicular to the two sections or lobes.

One embodiment of the subject matter of the invention is shown in the accompanying drawings in which:

FIG. 3 is a perspective view of the diaphragm or screen;

FIG. 4 is a perspective view of the bulb;

FIG. 5 is a diagram, and

FIG. 6 shows the distribution of the light when cars pass each other.

Figure 1:
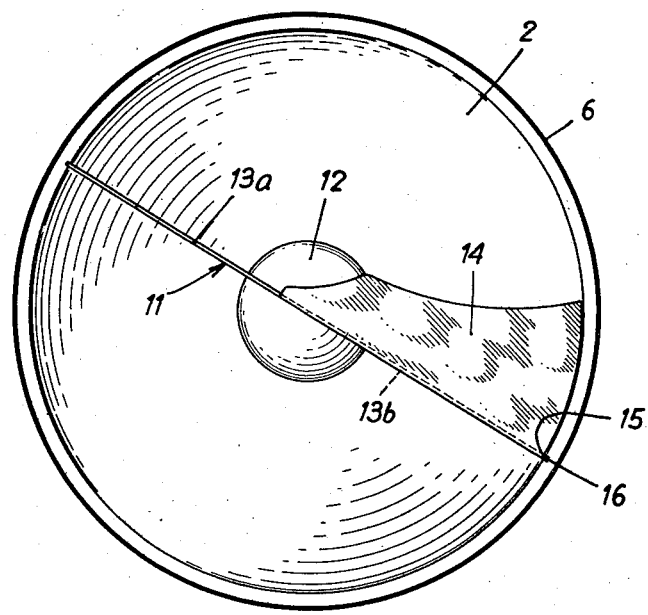
FIG. 1 is a front view of the headlight.
Figure 2:
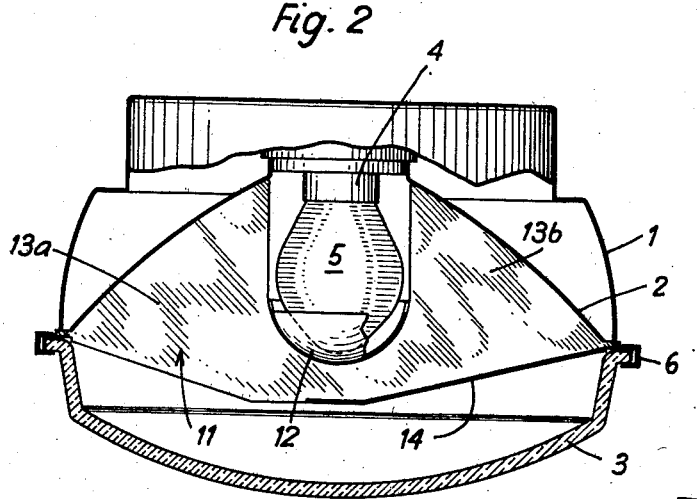
FIG. 2 is a plan view, partially in section.

The headlight shown includes a housing 1 with a reflector 2, a lens or light-dispersing glass 3 and a bulb socket 4 in which there is fastened a bulb 5. The lens or light-dispersing glass 3 is fastened by means of the clamping ring 6 to the housing 1.

The bulb 5 is of known construction in that it has a bright-light filament 7 and a dim filament 8. Below the latter, there is provided a masking shield 9 which intercepts all rays passing downward from the dim filament 8. At the front, the masking screen 9 has a lobe 10 so that no light rays can emerge directly in forward direction from the dim filament 8 either.

Furthermore, a diaphragm or shielding screen 11 is provided between the reflector 2 and the light-dispersing glass 3. This diaphragm 11 consists of a cup 12 to cover the end of the bulb 5, two sections or lobes 13a, 13b lying in a plane normal to the reflector 2 and a profiled section or lobe 14 arranged at a right angle to the said sections or lobes 13a, 13b. At the outer ends of the sections or lobes 13a, 13b there are provided projections 15 which are held by the clamping ring 6 in slots 16 of the housing 1. This diaphragm, however, could also be made integral with the housing or the reflector.

The arrangement is such that the axis of the beam of light, seen in the direction of travel, is directed obliquely downward and to the right.

This arrangement is explained schematically in FIG. 5. The plane of this figure represents a plane vertical to the road and parallel to the direction of travel $y$. The vertical is designated $x$. The straight line TE represents the projection of the plane tangential to the reflector surface at the apex of the reflector 2. The axis of the beam of light is indicated by SA. The headlight is so mounted that the plane through the straight line TE first of all forms with the vertical an angle which is greatly exaggerated in the drawing. Thereupon the entire headlight is turned by an angle of 20 to 40° and preferably an angle of 30°, around an axis $y'$ which is parallel to the horizontal. The direction of rotation of course depends on the legal regulations in the specific country. In those countries where one travels on the right the headlight is moved in clockwise direction as seen from the front. Actually, this adjustment is effected in advance, with respect to the headlight base not shown which serves to mount the headlight on the vehicle.

The cup 12 serves to mask the front of the bulb 5 so that no rays can emerge in the direction of travel. The lobes 13a, 13b prevent, when traveling with dim light, rays being reflected from the lower part of the reflector 2 (the part on the left in FIG. 1) towards the left, i.e., in the direction of the oncoming traffic. This would otherwise be the case in view of the arrangement of the dim filament 8 alongside the focus of the reflector 2.

The lobe 14, whose profile can be changed if desired, determines the left limiting line of the beam of light (FIG. 6). It furthermore serves for the horizontal delimiting of the beam.

It has furthermore been found that this headlight, due to the special inclination of the axis of the beam, creates particularly good illuminating conditions in fog. This is easily explained if one bears in mind that the rays are reflected by the particles of fog. If the axis of the beam is substantially horizontal, the rays will be reflected back substantially in frontal manner onto the driver. It is known for instance, that the driver sees better when he sticks his head out of the window of the car. With the headlight described, the rays are projected obliquely to the direction of travel, so that they are reflected obliquely and no longer back against the driver.

What is claimed is:

1. A headlight comprising a housing, a reflector mounted in said housing and having a generally horizontal axis, a bifilament bulb mounted within said housing along the axis of said reflector, said bulb having filaments disposed at an angle to the horizontal whereby the light beam from said bulb is reflected downwardly and to one side of said reflector axis, a lens closing said housing, a diaphragm mounted in said housing between said reflector and said lens for controlling the direction of the light beam; said diaphragm including a cup overlying the outer end of said bulb, two flat sections extending in opposite coplanar directions from the axis of said reflector and disposed at right angles to the axis of said reflector, and a third section carried by one of said two sections and disposed at right angles to said two sections and to the axis of said reflector.

2. A headlight according to claim 1, characterized by the fact the filaments of said headlight bulb include a dim filament provided with a masking screen which is inclined at the same angle as the axis of the light beam.

3. A headlight according to claim 1, characterized by the fact that the diaphragm is integral with the reflector.

4. A headlight according to claim 1, characterized by the fact that the diaphragm is integral with the housing.

5. A headlight comprising a housing, a reflector mounted in said housing and having a generally horizontal axis, a bifilament bulb mounted within said housing along the axis of said reflector, said bulb having filaments disposed at an angle to the horizontal whereby the light beam from said bulb is reflected downwardly and to one side of said reflector axis, a lens closing said housing, a diaphragm mounted in said housing between said reflector and said lens for controlling the direction of the light beam; said diaphragm including a cup overlying the outer end of said bulb, two flat sections extending in opposite coplanar directions from the axis of said reflector and disposed at right angles to the axis of said reflector, and a third section carried by one of said two sections and disposed at right angles to said two sections and to the axis of said reflector, said two sections being generally parallel to said filaments.

6. The headlight of claim 1 wherein said third section is of an extent less than a quadrant and being contoured to control the passage of the light beam.

7. A headlight according to claim 5 wherein the plane of said two sections is disposed at an angle of 20° to 40° to the horizontal.

8. A headlight according to claim 5 wherein the plane of said two sections is disposed at an angle of 30° to the horizontal.

References Cited in the file of this patent

UNITED STATES PATENTS

| | | |
|---|---|---|
| 1,748,057 | Arbuckle | Feb. 25, 1930 |
| 1,780,046 | Stewart | Oct. 28, 1930 |
| 2,045,512 | Bergmans | June 23, 1936 |
| 2,204,430 | Montague | June 11, 1940 |
| 2,665,371 | Rynearson | Jan. 5, 1954 |